United States Patent
Tanaka et al.

[19]

[11] Patent Number: 5,963,187
[45] Date of Patent: *Oct. 5, 1999

[54] LIQUID CRYSTAL DISPLAY APPARATUS USING LIQUID CRYSTAL HAVING FERROELECTRIC PHASE AND METHOD OF DRIVING LIQUID CRYSTAL DISPLAY DEVICE USING LIQUID CRYSTAL HAVING FERROELECTRIC PHASE

[75] Inventors: Tomio Tanaka, Hachioji; Tetsushi Yoshida, Kanagawa-ken; Katsuhito Sakamoto, Sagamihara; Jun Ogura, Fussa, all of Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/622,091

[22] Filed: Mar. 26, 1996

Related U.S. Application Data

[63] Continuation of application No. 08/467,758, Jun. 6, 1995, abandoned.

[30] Foreign Application Priority Data

| Jun. 10, 1994 | [JP] | Japan | 6-152675 |
| Sep. 22, 1994 | [JP] | Japan | 6-252678 |
| Sep. 22, 1994 | [JP] | Japan | 6-252681 |

[51] Int. Cl.$^6$ ........................... G09G 3/36
[52] U.S. Cl. ..................... 345/97; 345/96; 345/94
[58] Field of Search .................. 345/97, 96, 94; 359/56; 349/33, 37

[56] References Cited

U.S. PATENT DOCUMENTS

| 4,634,226 | 1/1987 | Isogai et al. | 345/96 |
| 5,046,823 | 9/1991 | Mori et al. | |
| 5,182,549 | 1/1993 | Taniguchi et al. | 345/97 |
| 5,459,481 | 10/1995 | Tanaka et al. | 345/95 |
| 5,490,000 | 2/1996 | Tanaka et al. | |
| 5,559,620 | 9/1996 | Tanaka et al. | |
| 5,615,026 | 3/1997 | Koden | 345/97 |

FOREIGN PATENT DOCUMENTS

| 0552045 A1 | 7/1993 | European Pat. Off. |
| WO 93/10477 | 5/1993 | WIPO |

OTHER PUBLICATIONS

Liquid Crystals, 1989, vol. 5, No. 4, pp. 1171–1177, L.A. Beresnev et al, Deformed Helix Ferroelectric Liquid Crystal Display: A New Electrooptic Mode in Ferroelectric Chiral Smectic C Liquid Crystals.

Optical Engineering, vol. 26, No. 5, May, 1987, Bellingham, U.S., pp. 373–384, J. Patel et al, "Properties and Applications of Ferroelectric Liquid Crystals".

*Primary Examiner*—Bipin H. Shalwala
*Assistant Examiner*—Kent Chang
*Attorney, Agent, or Firm*—Frishauf, Holtz, Goodman, Langer & Chick, P.C.

[57] ABSTRACT

In a TFT liquid crystal display device using a DHF liquid crystal, the DHF liquid crystal is alienable to a first alignment state in which liquid crystal molecules are substantially aligned to a first direction, to a second alignment state in which the liquid crystal molecules are substantially aligned to a second direction and to an arbitrary intermediate alignment state between the first and second alignment states, in accordance with a voltage applied between the pixel electrodes and the opposing electrode. One of a pair of polarization plates has an optical axis set in substantially an intermediate direction between the first and second directions. The optical axis of the other polarization plate is set perpendicular to the optical axis of the former polarization plate. A pulse having a voltage whose absolute value corresponds to a display gradation and whose polarity changes frame by frame is applied to the DHF liquid crystal for each pixel in the selection period of that pixel. A single pulse is applied for a single image signal.

19 Claims, 11 Drawing Sheets

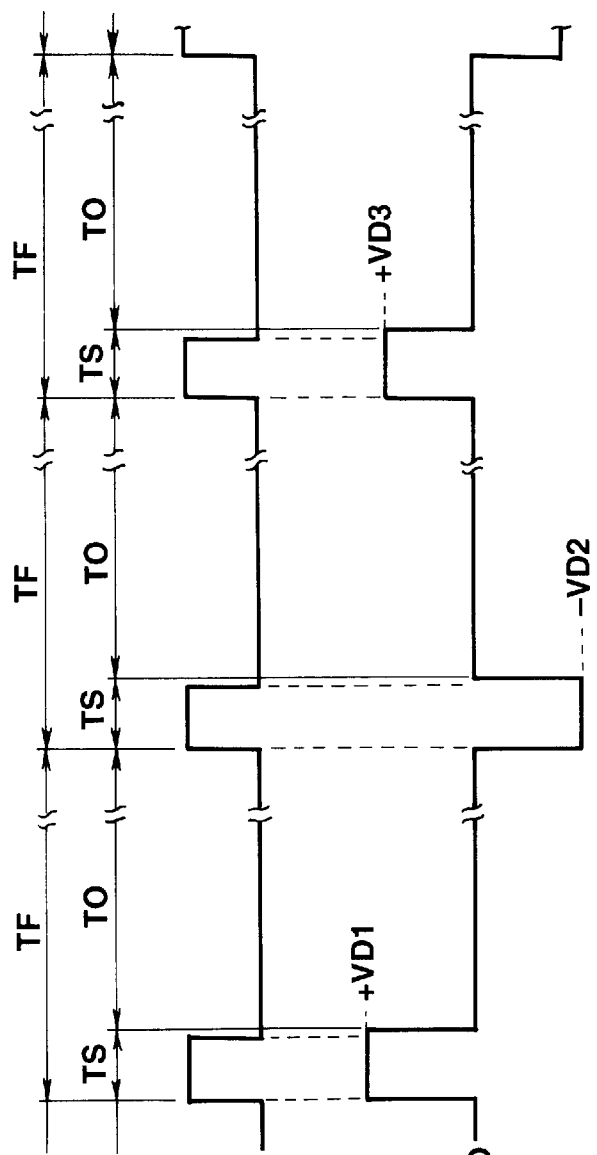

LIQUID CRYSTAL DISPLAY APPARATUS USING LIQUID CRYSTAL HAVING FERROELECTRIC PHASE AND METHOD OF DRIVING LIQUID CRYSTAL DISPLAY DEVICE USING LIQUID CRYSTAL HAVING FERROELECTRIC PHASE

CROSS-REFERENCE TO RELATED APPLICATION

This application is a Continuation of application Ser. No. 08/467,758, filed Jun. 6, 1995, now abandoned.

BACKGROUND OF THE INVENTION

1. Field of the Invention

The present invention relates to a liquid crystal display (LCD) device using a liquid crystal having a ferroelectric phase (including a ferroelectric liquid crystal and an antiferroelectric liquid crystal) and a method of driving this LCD device. More particularly, this invention relates to an LCD apparatus capable of presenting a gradation display and a method of driving a LCD device in this LCD apparatus.

This invention also relates to an LCD device using a liquid crystal which has a ferroelectric phase and to which dichroic dye is added.

2. Description of the Related Art

A liquid crystal device (FLC-device) using a liquid crystal having a ferroelectric phase is receiving attention due to its higher response and wider view angle than a TN mode LCD device using a nematic liquid crystal.

As an FLC-device, a ferroelectric LCD device using a ferroelectric liquid crystal and an antiferroelectric LCD device using antiferroelectric liquid crystal are known.

Conventionally, for the practical use of an FLC-device, studies have been made on a ferroelectric liquid crystal called an SS-F liquid crystal. But, the FLC-device using an SS-F liquid crystal cannot gradually change the transmittivity and thus cannot present a gradation display.

In this respect, an FLC-device capable of presenting a gradation display has been studied, and it has been proposed to use a ferroelectric liquid crystal whose chiral smectic phase has a helical pitch smaller than the distance between substrates of the display device. This type of ferroelectric liquid crystal is classified to an SBF liquid crystal which has a memory property and a DHF (Deformed Helical Ferroelectric) liquid crystal having no memory property (see "LIQUID CRYSTALS," 1989, Vol. 5, No. 4, pages 1171 to 1177).

In an LCD device using a DHF liquid crystal, this DHF liquid crystal is sealed between substrates, with the helical structure remaining intact. When a voltage whose absolute value is sufficiently large is applied between electrodes facing each other with a liquid crystal layer in between, the DHF liquid crystal becomes either a first alignment state in which the average direction of directions of the long axes of the liquid crystal molecules are aligned substantially to a first alignment direction or a second alignment state in which the average direction of the molecules of the liquid crystal is aligned substantially to a second alignment direction, in accordance with the polarity of the applied voltage. When the absolute value of the applied voltage is lower than the one which sets the DHF liquid crystal to the first alignment state or the second alignment state, the DHF liquid crystal becomes an intermediate alignment state in which the average direction of the long axes of the liquid crystal molecules comes between the first and second alignment directions, due to the helical deformation of the molecule alignment.

In an LCD device using an SBF liquid crystal, this SBF liquid crystal is sealed between substrates, with the helical structure remaining in no electric field state. When a voltage whose absolute value is equal to or greater than a predetermined value is applied between electrodes facing each other with a liquid crystal layer in between, the SBF liquid crystal becomes either a first alignment state in which the directions of the molecules of the liquid crystal are aligned substantially to a first alignment direction or a second alignment state in which the directions of the liquid crystal molecules are aligned substantially to a second alignment direction, in accordance with the polarity of the applied voltage. When the absolute value of the applied voltage is lower than the one which sets the SBF liquid crystal to the first alignment state or the second alignment state, the SBF liquid crystal becomes an intermediate alignment state in which the liquid crystal molecules whose average direction is aligned to the first alignment direction and the liquid crystal molecules whose average direction is aligned to the second alignment direction are mixed.

Conventionally, in an LCD device using a DHF liquid crystal or an SBF liquid crystal, the optical axis of one polarization plate is set parallel to the first or second alignment direction while the optical axis of the other polarization plate is set perpendicular to the optical axis of the former polarization plate.

Even when the voltage corresponding to the gradation to be displayed is applied to the liquid crystal in the LCD devices having the above structures, however, the applied voltage is not associated with the transmittivity of pixels so that the practical level of gradation display cannot be achieved. This is because the hysteresis of the optical characteristics of those LCD devices (the relationships between the applied voltage and the transmittivity) is large. Therefore, even when the voltage corresponding to the display gradation is applied, the display gradation is not specifically set due to the influence of the previously applied voltage.

To control the display gradation by reducing the influence of the hysteresis, a scheme has been proposed which drives the LCD device by applying the voltage that aligns the average direction of the liquid crystal molecules to the first or second alignment direction, and then applying the voltage corresponding to the display gradation. This driving method needs a complicated driving circuit and a longer selection period for writing data in each pixel.

An LCD device using the antiferroelectric liquid crystal (AFLC) displays an image by utilizing the stability of the alignment state of the AFLC. The AFLC has three stable states with regard to the alignment of the liquid crystal molecules. When a voltage equal to or higher than a first threshold value is applied to the AFLC, the AFLC is aligned to a first ferroelectric phase where the liquid crystal molecules are aligned to a first alignment direction or a second ferroelectric phase where the liquid crystal molecules are aligned to a second alignment direction, in accordance with the polarity of the applied voltage. When a voltage whose absolute value is lower than the first threshold value and a second threshold value is applied, the AFLC is aligned to an antiferroelectric phase where the average alignment direction of the liquid crystal molecules is substantially parallel to the normal line of the smectic layer. A pair of polarization plates are located on both side of the LCD device. The transmission axis of the polarization plates are set with the optical axis of the antiferroelectric phase as a reference.

The antiferroelectric liquid crystal has a memory property. More specifically, even when the applied voltage varies within ranges having the first and second thereshold values as their borders, the alignment state of the first or second ferroelectric phase or the antiferroelectric phase is maintained. The conventional antiferroelectric LCD device is driven in a direct matrix manner using this memory property.

The memory property of the AFLC is determined by the difference between the voltage which causes the transition of the liquid crystal to the antiferroelectric phase from the first or second ferroelectric phase and the voltage which causes the transition of the liquid crystal to the first or second ferroelectric phase from the antiferroelectric phase. The greater this voltage difference is, the higher the memory property for memorizing the alignment state becomes.

In this respect, the conventional antiferroelectric LCD device uses a liquid crystal which provides the large voltage difference, as the AFLC.

However, the conventional antiferroelectric LCD device using an AFLC having a higher memory property can hardly control the display gradation and cannot therefore accomplish the gradation display.

Since the conventional FLC-device uses two polarization plates, the amount of light absorption by the polarization plates is large, resulting in a dark display.

Further, the linearly polarized light which has passed the incident-side polarization plate undergoes different birifringence effects for different wavelengths while passing the liquid crystal layer. Therefore, the linearly polarized light becomes different elliptically polarized lights for different wavelengths. The component of each elliptically polarized light which is parallel to the transmission axis of the outgoing-side polarization plate goes out from the transmission axis. Therefore, the intensity of the outgoing light differs wavelength by wavelength, coloring the display.

As the optical characteristic of the LCD device depends on the optical anisotropy Δn and the product And of the optical anisotropy Δn and the thickness d of the liquid crystal layer, the liquid crystal and the selection of the liquid crystal layer are limited.

SUMMARY OF THE INVENTION

Accordingly, it is an object of the present invention to provide an LCD apparatus which uses a liquid crystal having a ferroelectric phase has a simple structure and can present a gradation display, and a method of driving an LCD device using a liquid crystal having a ferroelectric phase, has a simple structure and can present a gradation display.

It is another object of this invention to provide an LCD device which uses a liquid crystal having a ferroelectric phase and presents a bright display.

It is a further object of this invention to provide an LCD device which uses a liquid crystal having a ferroelectric phase and can prevent a display image from being colored.

It is a still further object of this invention to provide an LCD device which uses a liquid crystal having a ferroelectric phase and has an improved design freedom.

To achieve the above objects, an LCD apparatus (1 to 22) according to the first aspect of this invention comprises:

an LCD device (1 to 14) using a liquid crystal having a ferroelectric phase and including a first substrate (1) having pixel electrodes (3) formed thereon, a second substrate (2) having an opposing electrode (7) facing the pixel electrodes, formed thereon, a liquid crystal (11) having a ferroelectric phase and arranged between the first and second substrates, and at least one polarization plate (13, 14) arranged at a back of at least one of the first and second substrates, the liquid crystal and the at least one polarization plate providing the LCD device a substantially same optical change in association with a change in absolute values of voltages of different polarities applied between the pixel electrodes and the opposing electrode; and driving means (22) for receiving an image signal corresponding to a display image and applying one drive pulse having a voltage corresponding to the image signal between associating one of the pixel electrodes and the opposing electrode and inverting a polarity of the applied voltage frame by frame.

According to the above structure, the LCD device in use shows a substantially equal optical change in association with a change in absolute values of voltages of different polarities applied between the pixel electrodes and the opposing electrode. For example, an LCD device having the following structure can be used: the optical axis of the first polarization plate is set to an intermediate direction between the first and second alignment directions and the optical axis of the second polarization plate is set perpendicular or parallel to the optical axis of the first polarization plate. It is therefore possible to display a clear gradation image by simply applying a single drive pulse having the voltage value whose absolute value corresponds to the gradation of the display image, between the pixel electrodes and the opposing electrode.

Because the display gradation of one pixel does not drastically change so much between consecutive frames, when the one drive pulse whose polarity inverts frame by frame is applied to the liquid crystal, the voltages of the positive and negative polarities are canceled out between the consecutive frames, thus eliminating the local concentration of charges in the liquid crystal and preventing the burning of the display.

According to the second aspect of this invention, there is provided a method of driving an LCD device (1 to 14) including a first substrate (1) having pixel electrodes (3) formed thereon, a second substrate (2) having an opposing electrode (7) facing the pixel electrodes, formed thereon, a liquid crystal (11) having a ferroelectric phase and arranged between the first and second substrates, and at least one polarization plate (13, 14), the LCD device showing a substantially same optical change in association with a change in absolute values of voltages of different polarities applied between the pixel electrodes and the opposing electrode, the method comprising the step of:

receiving an image signal corresponding to a display image frame by frame and applying one drive pulse having a voltage whose absolute value corresponds to the image signal, between associating one of the pixel electrodes and the opposing electrode while inverting a polarity of the applied voltage frame by frame.

According to the above structure, the LCD device shows a substantially equal optical change in association with a change in absolute values of voltages of different polarities applied between the pixel electrodes and the opposing electrode. It is therefore possible to present a clear gradation display by simply applying a single drive pulse having the voltage value whose absolute value corresponds to the gradation of the display image, between the pixel electrodes and the opposing electrode.

Because the display gradation of one pixel does not drastically change so much between consecutive frames, when the one drive pulse whose polarity inverts frame by frame is applied to the liquid crystal, the voltages of the positive and negative polarities are canceled out between the consecutive frames, thus eliminating the local concentration of charges in the liquid crystal and preventing the burning of the display.

An LCD device according to the third aspect of this invention comprises:

a first substrate (1) having electrodes (3) formed thereon;

a second substrate (2) having an opposing electrode (7) facing the electrodes (3), formed thereon;

a liquid crystal (11) arranged between the first and second substrates and having a layer structure in a smectic phase, the liquid crystal being alienable to a first alignment state in which liquid crystal molecules are substantially aligned to a first alignment direction, to a second alignment state in which the liquid crystal molecules are substantially aligned to a second alignment direction and to an intermediate alignment state in which an average alignment direction of the liquid crystal molecules comes between the first and second alignment directions in accordance with a voltage applied between the electrodes and the opposing electrode;

a dichroic dye added to the liquid crystal (11); and one polarization plate (13) arranged near the first or second substrate (1, 2) and having an optical axis set at or between the first alignment direction and the second alignment direction.

The dichroic dye has its long axis aligned along the average alignment direction of the liquid crystal molecules, and absorbs the polarized light component of the light passing the liquid crystal which is parallel to the average direction of the liquid crystal molecules. According to this structure, therefore, gradation display can be accomplished by the use of a single polarization plate and by controlling the average direction of the liquid crystal molecules by the adjustment of the voltage applied to the ferroelectric liquid crystal.

BRIEF DESCRIPTION OF THE DRAWINGS

FIG. 5A is a diagram showing the waveform of a gate signal to be supplied to a gate line by a method of driving a ferroelectric LCD device according to the first embodiment of this invention;

FIG. 5B is a diagram showing the waveform of a data signal to be supplied to a data line by the method of driving a ferroelectric LCD device according to the first embodiment of this invention;

DETAILED DESCRIPTION OF THE PREFERRED EMBODIMENTS

Preferred embodiments of the present invention will now be described with reference to the accompanying drawings.

First Embodiment

Figure 1:
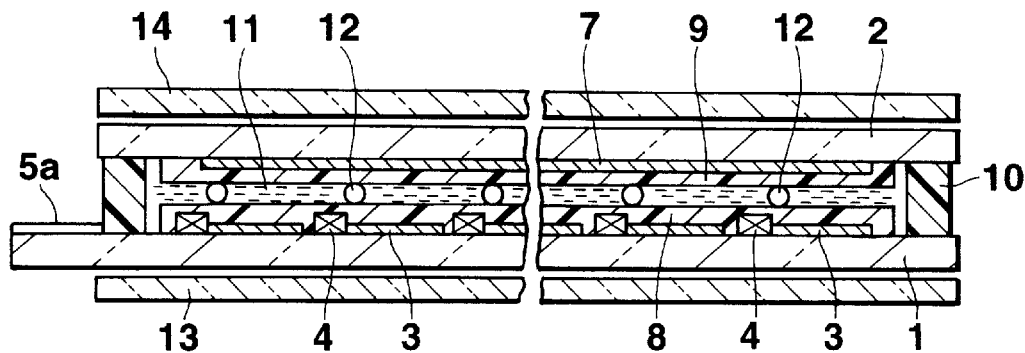
FIG. 1 is a cross-sectional view showing the structure of an LCD device according to a first embodiment of this invention.

To begin with, the structure of an LCD device according to the first embodiment will be discussed. FIG. 1 is a cross-sectional view of the LCD device, and FIG. 2 is a plan view of a transparent substrate on which pixel electrodes and active elements are formed.

This LCD device, which is of an active matrix type, has a pair of transparent substrates (e.g., glass substrates) 1 and 2. Transparent pixel electrodes 3, made of a transparent conductive material like ITO, and thin film transistors (hereinafter called TFTs) 4 having sources connected to the associated pixel electrodes 3 are arranged on the lower transparent substrate (hereinafter called lower substrate) 1 in a matrix form.

Figure 2:
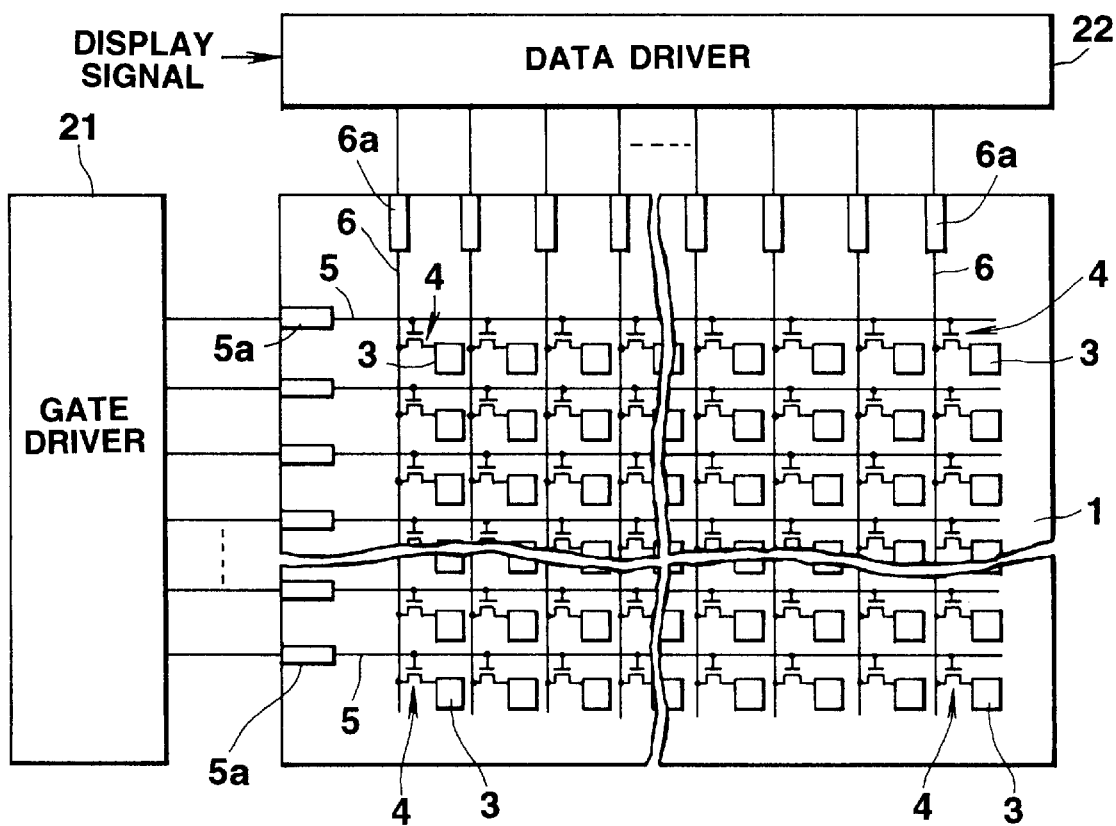
FIG. 2 is a plan view showing the structure of a lower substrate of the LCD device shown in FIG. 1.

As shown in FIG. 2, gate lines (scan lines) 5 are laid between the rows of pixel electrodes 3 and data lines (color signal lines) 6 are laid between the columns of pixel electrodes 3. The gate electrodes of the individual TFTs 4 are connected to the associated gate lines 5, and the drain electrodes of the TFTs 4 are connected to the associated data lines 6.

The gate lines 5 are connected via terminal portions 5a to a gate driver (scan driver) 21, and the data lines 6 are connected via terminal portions 6a to a data driver (signal driver) 22. The gate driver 21 applies a gate voltage (gate pulse) to the gate lines 5 and scans the gate lines 5. The data driver 22 applies a data signal corresponding to a display signal (gradation signal) to the data lines 6 upon reception of the display signal.

In FIG. 1, an opposing electrode 7, which opposes the individual pixel electrodes 3 and is applied with a reference voltage V0, is formed on the upper transparent substrate (hereinafter called upper substrate) 2.

Aligning films 8 and 9 are provided on the opposing surfaces of the lower substrate 1 and the upper substrate 2, respectively. The aligning films 8 and 9 are homogeneous alignment films formed of an organic polymerization compound, such as polyimide, and their opposing surfaces are subjected to an aligning treatment by rubbing.

The lower substrate 1 and the upper substrate 2 are adhered at their peripheral edge portions via a frameshaped seal member 10. A liquid crystal 11 is sealed in an area surrounded by the substrates 1 and 2 and the seal member 10. The liquid crystal 11 is a DHF (Deformed Helical Ferroelectric) liquid crystal. The DHF liquid crystal is a ferroelectric liquid crystal whose helical pitch in a chiral smectic C phase is smaller than the distance between both substrates 1 and 2 and which does not memorize the alignment state. The helical pitch of the DHF liquid crystal is equal to or smaller than 700 nm to 400 nm that is the wavelength of a visible light band, and which has large spontaneous polarization and a cone angle of about 27 degrees to 45 degrees (preferably 27 degrees to 30 degrees).

The DHF liquid crystal forms a uniform layer structure in such a way that the normal line of the layer of the layer structure in the chiral smectic C phase is directed toward the direction of the aligning treatment subjected to the alignment films 8 and 9. Since the helical pitch of the DHF liquid crystal is smaller than the distance between both substrates 1 and 2, the DHF liquid crystal is sealed between the substrates 1 and 2, with the helical structure remaining intact. When a voltage whose absolute value is sufficiently large is applied between the pixel electrodes 3 and the opposing electrode 7, the DHF liquid crystal becomes either a first alignment state in which the directions of substantially all liquid crystal molecules are aligned substantially to a first alignment direction or a second alignment state in which the directions of the substantially all liquid crystal molecules are aligned substantially to a second alignment direction, in accordance with the polarity of the applied voltage. When a voltage whose absolute value is lower than the voltage which sets the DHF liquid crystal to the first or second alignment state is applied between the pixel electrodes 3 and the opposing electrode 7, the DHF liquid crystal becomes an intermediate alignment state in which the average direction of the liquid crystal molecules of the DHF liquid crystal (i.e., the director of the DHF liquid crystal) comes between the first and second alignment directions, due to the deformation of the helical structure of the molecule alignment.

Gap members 12 restrict the distance between both substrates 1 and 2. The gap members 12 are studded in the liquid-crystal sealed area.

A pair of polarization plates 13 and 14 are arranged at the top and bottom of the LCD device. The relation between the optical axes of the polarization plates 13 and 14 (transmission axes or absorption axes; the optical axis will be described treated as a transmission axis in the following description) and the alignment directions of the liquid crystal molecules of the liquid crystal 11 will be described with reference to FIG. 3.

Figure 3:
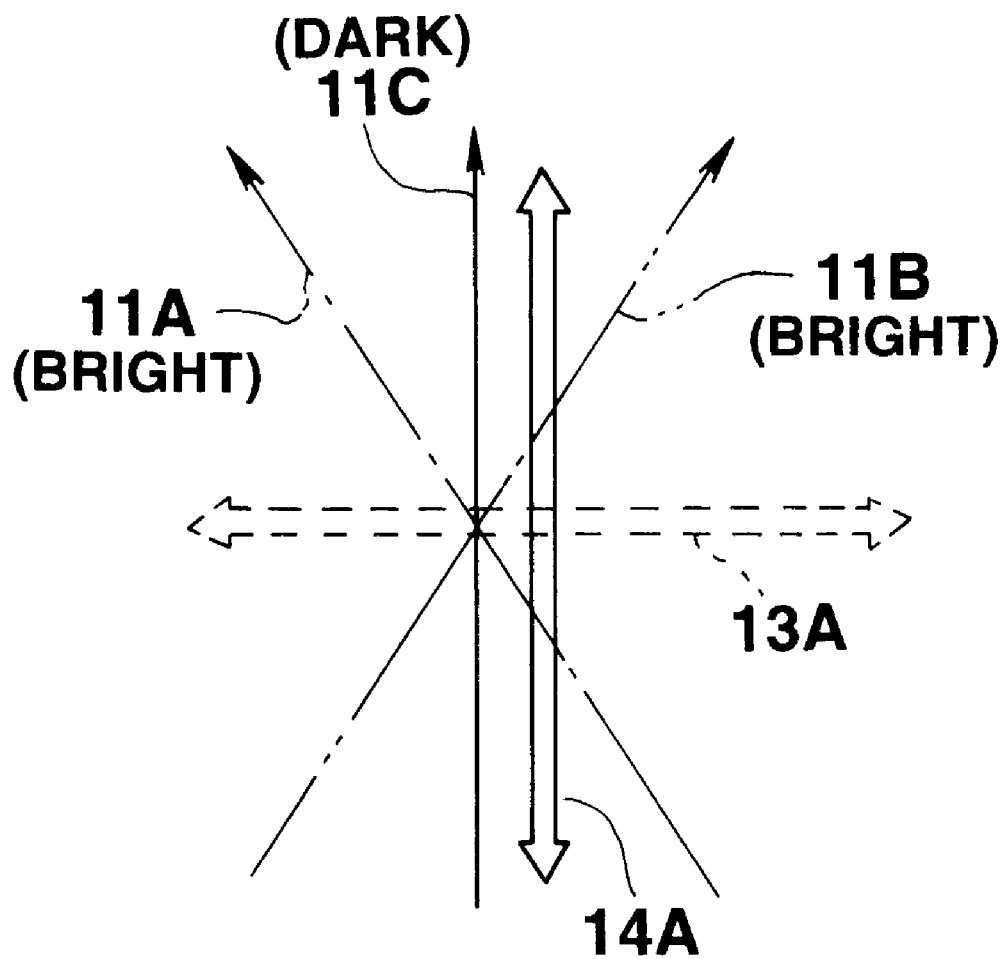
FIG. 3 is a plan view showing the directions of the transmission axes of upper and lower polarization plates and the alignment direction of liquid crystal molecules.

In FIG. 3, reference numerals "11A" and "11B" indicate the directions of the liquid crystal molecules in the first and second alignment states, i.e., they indicate the first and second alignment directions, respectively. Reference numerals "13A" and "14A" indicate the directions of the transmission axes of the lower polarization plate 13 and the upper polarization plate 14 in FIG. 1.

When a voltage which has one polarity and whose absolute value is sufficiently large is applied to the liquid crystal 11, the liquid crystal 11 becomes the first alignment state and directions of substantially all liquid crystal molecules are aligned to the first alignment direction 11A. When a voltage which has the other polarity and whose absolute value is sufficiently large is applied to the liquid crystal 11, the liquid crystal 11 becomes the second alignment state and the directions of substantially all liquid crystal molecules are aligned to the second alignment direction 11B. When the applied voltage is zero, the average direction of the liquid crystal molecules is aligned parallel to the normal line to the smectic layer of the liquid crystal 11 or is aligned to a direction 11C between the first and second alignment directions 11A and 11B.

The shift angle θ between the first alignment direction 11A and the second alignment direction 11B is set to 25 degrees to 45 degrees, depending on the type of the liquid crystal 11, but preferably 27 degrees to 45 degrees.

The transmission axis of one of the polarization plates 13 and 14, for example, the transmission axis 14A of the upper polarization plate 14 is set substantially parallel to the normal line to the smectic layer of the liquid crystal 11. The transmission axis of the other polarization plate, e.g., the transmission axis 13A of the lower polarization plate 13 is set substantially perpendicular to the transmission axis 14A of the upper polarization plate 14.

The ferroelectric LCD device in which the transmission axes of the polarization plates 13 and 14 are set as illustrated in FIG. 3 has the highest transmittivity (brightest display) when the liquid crystal becomes the first or second alignment state in which the directions of the liquid crystal molecules are aligned to the first alignment direction 11A or the second alignment direction 11B, respectively. The transmittivity becomes the lowest (darkest display) when the average direction of the liquid crystal molecules are aligned to the intermediate direction 11C substantially parallel to the normal line to the layer in the smectic phase. More specifically, when the directions of the liquid crystal molecules are aligned to the first alignment direction 11A or the second alignment direction 11B, linearly polarized light having passed the incident-side polarization plate (polarizer) becomes non-linearly polarized light due to the birefringence effect of the liquid crystal 11. The component of the light having passed the liquid crystal 11 which is parallel to the transmission axis of the outgoing-side polarization plate (analyzer) passes the analyzer and goes out, making the display brighter. When the average diction of the liquid crystal molecules is aligned to the intermediate direction 11C, linearly polarized light having passed the incident-side polarization plate hardly affected by the birefringence effect of the liquid crystal 11, and passes the liquid crystal layer as the linearly polarized light. Therefore, most of the light having passed the liquid crystal 11 is absorbed by the outgoing-side polarization plate, making the display darker.

The average direction of the liquid crystal molecules continuously varies between the alignment directions 11A and 11B in accordance with the polarity and value (absolute value) of the applied voltage. Thus, the transmittivity of the ferroelectric LCD device can change continuously.

Figure 4A:
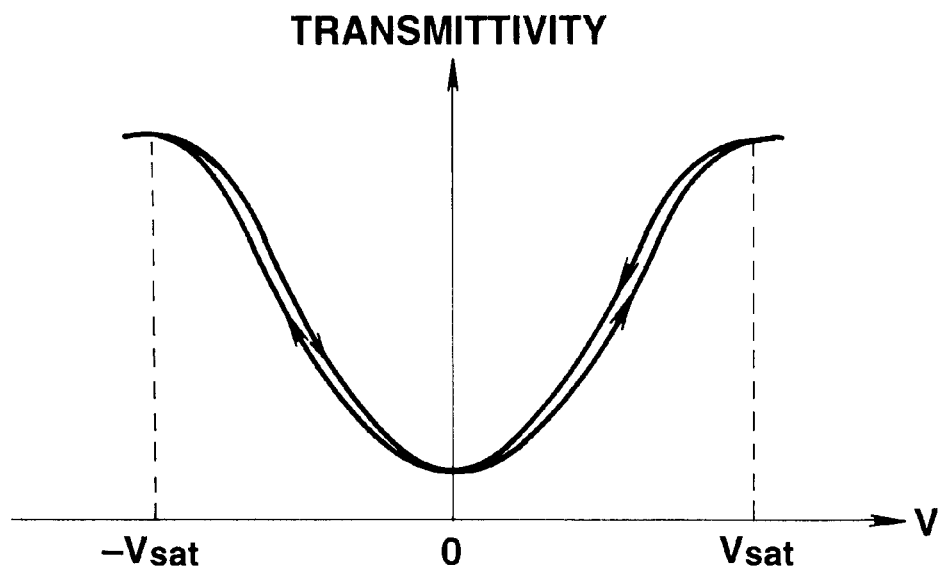
FIG. 4A is a graph showing the relation between the applied voltage and transmittivity when a DHF liquid crystal desirable in the first embodiment is used.
Figure 4B:
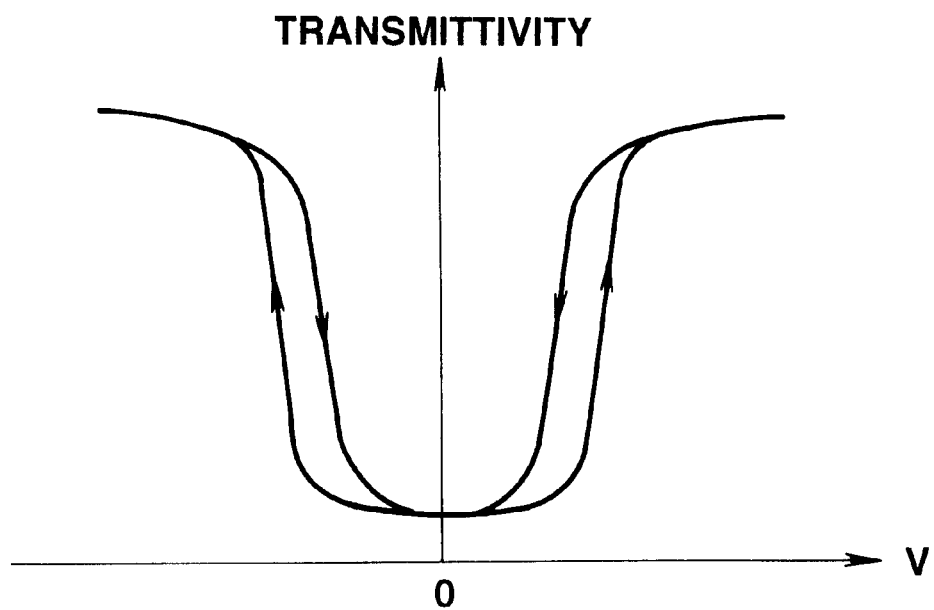
FIG. 4B is a graph showing the relation between the applied voltage and transmittivity when a DHF liquid crystal, which is not desirable in the first embodiment, is used.

Now, the characteristic of the liquid crystal 11 will be described. With the polarization plates 13 and 14 arranged as shown in FIG. 3, the transmittivity becomes lowest when no voltage is applied to the liquid crystal 11 (between the electrodes 3 and 7) and becomes higher as the absolute value of the applied voltage increases. The DHF liquid crystal 11 used in this embodiment has an optical response characteristic which continuously and smoothly changes (having no specific threshold value) as shown in FIG. 4A when a voltage with a triangular waveform having a relatively low frequency (about 0.1 Hz) is applied to the DHF liquid crystal 11, and shows a substantially equal optical change in association with a change in the absolute value of voltages of different polarities applied to the DHF liquid crystal 11. In other words, the ferroelectric liquid crystal in use has a smooth optical response characteristic and has an optical characteristic which becomes a line symmetrical with the vertical axis at the position of the applied voltage of zero as the reference. It is desirable that the hysteresis of the optical response characteristic be smaller.

It is not desirable to use the DHF liquid crystal having a specific threshold value in the optical response characteristic or the DHF liquid crystal whose transmittivity drastically changes even with a slight change in voltage.

The method of driving the thus constituted ferroelectric LCD device will be described with reference to FIGS. 5A and 5B.

FIG. 5A shows the waveform of a gate pulse the gate driver 21 applies to the gate line 5 connected to the first row of TFTs 4, and FIG. 5B shows the waveform of a data signal the data driver 22 applies to the data line 6. For easier understanding, only the data signal for the first row of pixels is illustrated and the data signals for the other rows are not illustrated.

In FIGS. 5A and 5B, TF indicates one frame period, TS indicates the selection period of the first row of pixels, and TO indicates a non-selection period. Each selection period TS is about 45 $\mu$s, for example.

In this embodiment, a drive pulse (write pulse) having a voltage value VD whose absolute value corresponds to the display gradation is applied to the data line 6 in the selection period for each frame, as shown in FIG. 5B. With regard to a single piece of display data (single segment of the display signal), one drive pulse whose voltage value is VD or –VD and whose polarity is positive or negative is applied to the associated pixel in the selection period TS for that pixel.

For example, when the frame-by-frame display gradations of the pixel at the first row and the first column are I1, I2, I3, I4 and so forth, the voltage of the drive pulse is changed in the order of +VD1, –VD2, +VD3, –VD4 and so forth, as shown in FIG. 5B. The voltages VD1, VD2, VD3, VD4 and so forth are absolute values corresponding to the display gradations I1, I2, I3, I4 and so forth. (The voltage of the drive pulse may be changed to –VD1, +VD2, –VD3, +VD4 and so forth.)

The polarity and absolute value of the drive pulse are the polarity and voltage with respect to the reference voltage V0 of the data signal. The reference voltage V0 is the same as the voltage to be applied to the opposing electrode 7.

In this driving method, the write voltage VD is controlled within the range of V0 to $V_{max}$ where V0 is the minimum value of the write voltage VD and the maximum value $V_{max}$ is set slightly lower than the voltage (Vsat in FIG. 4A) by which the saturation of the transmittivity occurs.

When the ferroelectric LCD device is driven by the gate signal and data signal which have the above-described waveforms, the voltage (write voltage) VD of the drive pulse is applied to the pixel electrode 3 via the associated TFT 4, which is turned on by the gate pulse, in the selection period TS for each row.

When the gate pulse is disabled, resulting in the non-selection period TO, the TFTs 4 are turned off so that the voltage corresponding to the write voltage VD is held in the capacitor (pixel capacitor) formed by the pixel electrode 3, the opposing electrode 7 and the liquid crystal 11 therebetween. In the non-selection period TO, therefore, the transmittivity of the pixel is kept at the value corresponding to the voltage held by the pixel capacitor or the value corresponding to the write voltage VD.

In this embodiment, the liquid crystal 11 provides a transmittivity which continuously changes with a change in applied voltage and the optical arrangement as illustrated in FIG. 3 is employed. Therefore, the transmittivity with respect to the absolute value of the write voltage VD is determined almost specifically, so that clear gradation display can be accomplished by controlling the transmittivity by adjusting the absolute value of the write voltage VD.

The polarity of the applied voltage is inverted frame by frame in this embodiment. However, since the DHF liquid crystal 11 showing substantially the same optical change with respect to a change in the absolute value of a voltage having different polarities, the desired gradation display can be accomplished even when the polarity is inverted.

On the pixel-by-pixel basis, it is unlikely that the displayed image changes considerably between consecutive frames. Accordingly, the absolute values of the applied voltages VD1 and VD2 are substantially equal to each other. By inverting the polarity frame by frame, therefore, the applied voltage is canceled out between a plurality of frames, thus eliminating the local concentration of charges in the DHF liquid crystal 11 and preventing the burning of the display.

SPECIFIC EXAMPLE 1

Figure 6:
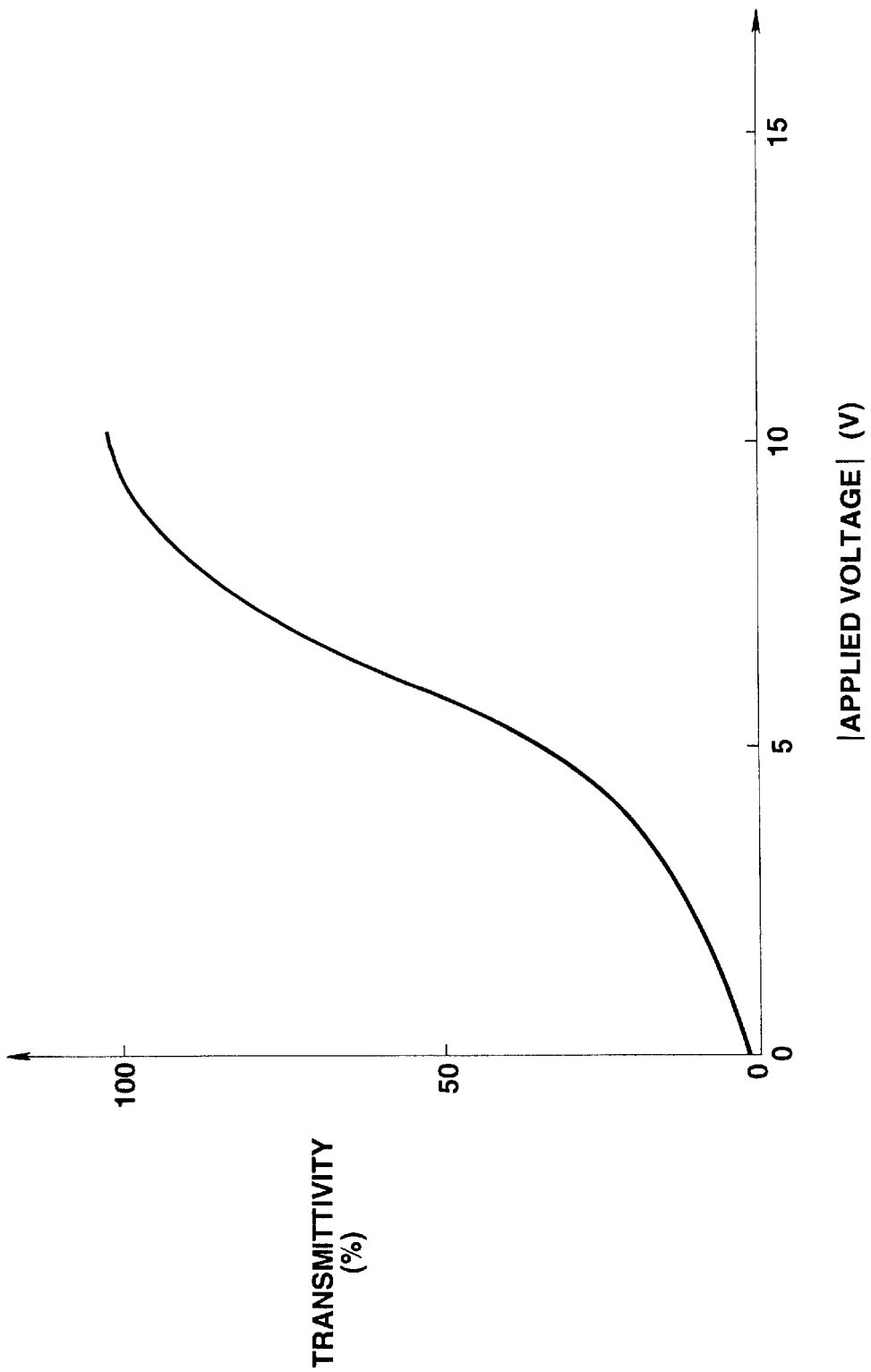
FIG. 6 is a graph showing the relation between the applied voltage and transmittivity for a specific example of a DHF liquid crystal display device according to the first embodiment of this invention.

FIG. 6 shows the relation between the applied voltage and transmittivity when the liquid crystal in use is a DHF liquid crystal whose I-SA transition temperature of 62.5° C. and SA-SC transition temperature of 61.2° C. with the helical pitch of 0.15 $\mu$m, the direction of the aligning treatment and the direction of the transmission axis of the polarization plate are set as illustrated in FIG. 3, each selection period TS is 60 $\mu$s, the drive pulse has different polarities frame by frame as shown in FIG. 5B, and the absolute value of the voltage VD of the drive pulse is changed by the units of 0.5 V in the range of 0 V to 10 V.

It is apparent from the graph in FIG. 6 that this driving method changes the absolute value of the voltage value of the drive pulse to continuously change the transmittivity and determines the display gradation almost specifically in accordance with the absolute value of the voltage value of the drive pulse, thus ensuring gradation display.

Figure 7:
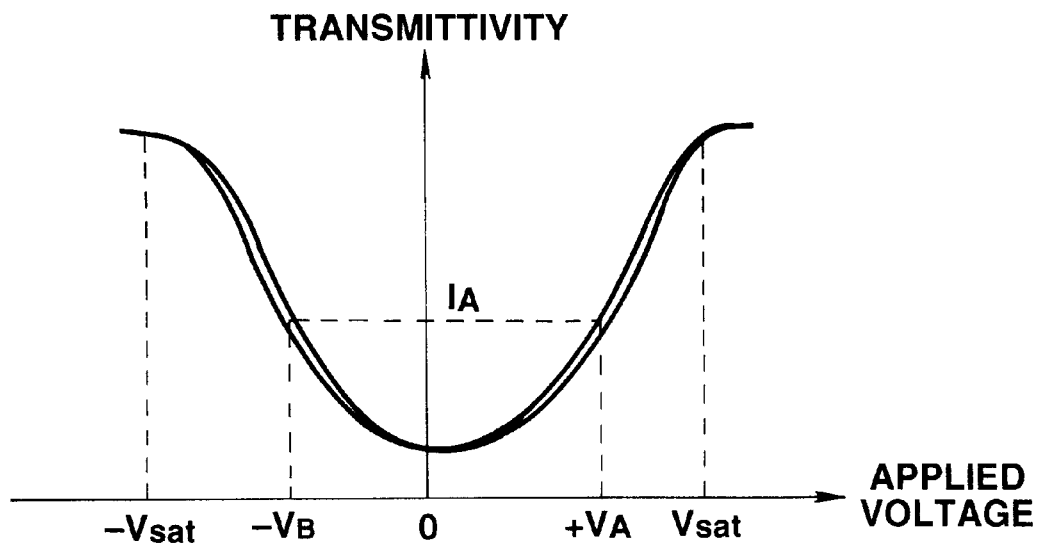
FIG. 7 is a graph showing the relation between the applied voltage and transmittivity in the case where the optical characteristic varies in accordance with the polarity of the applied voltage.

When voltages having the opposite polarities and the same absolute value are applied to the liquid crystal 11 (between the electrodes 3 and 7), the transmittivities slightly differ from each other and do not become exactly the same. Since the ferroelectric LCD device in use shows substantially the same optical change with respect to the application of voltages of different polarities, no practical problem would arise. Further, the LCD device may be driven in consideration of the difference between transmittivities caused by the difference in polarity between the applied voltages. Given that the voltage of the positive polarity to obtain the display gradation IA is +$V_A$ and the voltage of the negative polarity to also obtain $I_A$ is –$V_B$ ($V_A$ is not equal to $|-V_B|$) as shown in FIG. 7, for example, when the transmittivity $I_A$ is specified, the drive pulse of the voltage +$V_A$ may be applied to the liquid crystal 11 in odd-numbered frames and the drive pulse of the voltage $-V_B$ may be applied to the liquid crystal 11 in even-numbered frames.

Second Embodiment

Although a DHF liquid crystal is used as the liquid crystal 11 in the first embodiment, an SBF liquid crystal may also be used as the liquid crystal 11.

An SBF liquid crystal is a ferroelectric liquid crystal whose helical pitch (natural pitch) in a chiral smectic phase is smaller than the distance between both substrates 1 and 2 and which has a bistability. The SBF liquid crystal is made of a ferroelectric liquid crystal substance whose helical pitch is equal to or smaller than 700 nm to 400 nm that is the wavelength of a visible light band, and which has large spontaneous polarization and a large cone angle (for example, about 27 degrees to 45 degrees (preferably 27 degrees to 30 degrees)).

The helical pitch of the SBF liquid crystal is smaller than the distance between both substrates.

The relation between the transmittivities of the polarization plates 13 and 14 and the alignment directions of the liquid crystal when an SBF liquid crystal is used is the same as that in the first embodiment. When a voltage which has one polarity and whose absolute value is sufficiently large is applied to the SBF liquid crystal 11, the SBF liquid crystal 11 becomes the first stable state and the directions of the liquid crystal molecules are aligned substantially to the first alignment direction 11A indicated in FIG. 3. When a voltage which has the other polarity and whose absolute value is sufficiently large is applied to the SBF liquid crystal 11, the SBF liquid crystal 11 becomes the second stable state and the directions of the liquid crystal molecules are substantially aligned to the second alignment direction 11B indicated in FIG. 3. When the voltage applied to the liquid crystal 11 lies between the voltage that ensures the first stable state and the voltage that ensures the second stable state, minute areas in the first alignment stable state and minute areas in the second alignment stable state are mixed in accordance with the applied voltage. Therefore, the average direction of the liquid crystal molecules is aligned toward a voltage-oriented arbitrary direction between the first alignment direction 11A and the second alignment direction 11B. The shift angle e between the first alignment direction 11A and the second alignment direction 11B is set to 25 degrees to 45 degrees, depending on the type of the liquid crystal 11, but preferably 27 degrees to 45 degrees.

The transmission axis of one polarization plate, for example, the transmission axis 14A of the upper polarization plate 14 is set substantially parallel to the intermediate direction 11 between the alignment directions 11A and 11B as shown in FIG. 3. The transmission axis 13A of the lower polarization plate 13 is set substantially perpendicular to the transmission axis 14A of the upper polarization plate 14. The LCD device in which the transmission axes of the polarization plates 13 and 14 are set as illustrated in FIG. 3 has the highest transmittivity when the liquid crystal becomes the first or second alignment state in which the liquid crystal molecules are aligned to the first alignment direction 11A or the second alignment direction 11B, and has the lowest transmittivity when the liquid crystal molecules are aligned to the intermediate direction 11C, as per the first embodiment.

The other structure of the LCD device of this embodiment is the same as that of the first embodiment.

With the structure of the second embodiment, an image with an arbitrary gradation can be displayed by driving the LCD device with the applied write voltage VD whose polarity is inverted frame by frame and whose absolute value corresponds to the display signal (display gradation).

Third Embodiment

Although a DHF liquid crystal and an SBF liquid crystal which are ferroelectric liquid crystals are used as the liquid crystal 11 in the first and second embodiments, an antiferroelectric liquid crystal (AFLC) may be used as well.

Since the helical pitch of an AFLC is greater than the distance between both substrates 1 and 2, the AFLC is sealed between the substrates 1 and 2 without the helical structure of the smectic phase. When no voltage is applied to this AFLC, the AFLC shows an antiferroelectric phase. When a voltage which has one polarity and whose absolute value is sufficiently large is applied to the AFLC, the average direction of the liquid crystal molecules is aligned to the first alignment direction 11A. When a voltage which has the other polarity and whose absolute value is sufficiently large is applied to the AFLC, the directions of the liquid crystal molecules are aligned to the second alignment direction 11B.

When the voltage applied to the AFLC lies between the voltages that cause the liquid crystal molecules to be respectively aligned to the first and second alignment directions, the average direction of the liquid crystal molecules is aligned between the first alignment direction 11A and the second alignment direction 11B.

The transmission axes of the pair of polarization plates 13 and 14 are arranged as illustrated in FIG. 3, as per the first embodiment.

In this embodiment, the following three types of AFLCs may be used.

(1) A liquid crystal which shows an antiferroelectric phase only within a very narrow range of the applied voltage near 0 V, shows a sharp change in the optical response characteristic curve, and hardly has flat areas in the area having an antiferroelectric phase.

Figure 8:
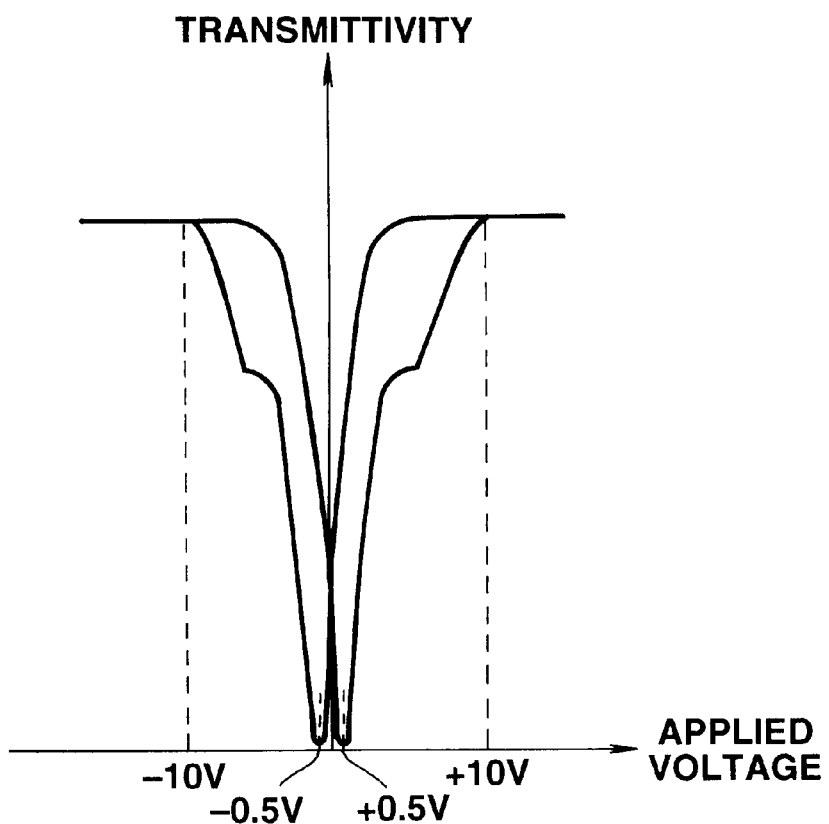
FIG. 8 is a graph showing the optical response characteristic for explaining an antiferroelectric liquid crystal usable in a third embodiment of this invention.

FIG. 8 exemplifies the optical response characteristic of this type of AFLC. This optical response characteristic is obtained by arranging a pair of polarization plates as shown in FIG. 3 and a voltage having a low frequency of about 0.1 Hz and a triangular waveform is applied to the AFLC. This AFLC has a characteristic which shows an antiferroelectric phase only within a very narrow applied-voltage range of about ±0.5 V and has a sharp curve, and hardly has flat areas in the area having an antiferroelectric phase.

Because this type of AFLC has a wide applied-voltage range which causes antiferroelectric-ferroelectric phase transition pre-driving phenomenon, the AFLC has numerous intermediate optical states in accordance with the applied voltage and does not have any specific threshold value in its optical response characteristic. Therefore, this AFLC is suitable for the driving method of this invention.

(2) An AFLC whose average direction is not aligned to the direction normal to the smectic layer when the applied voltage is zero, but is aligned to the direction normal to the smectic layer at two voltage values of the applied voltage other than zero.

Figure 9:
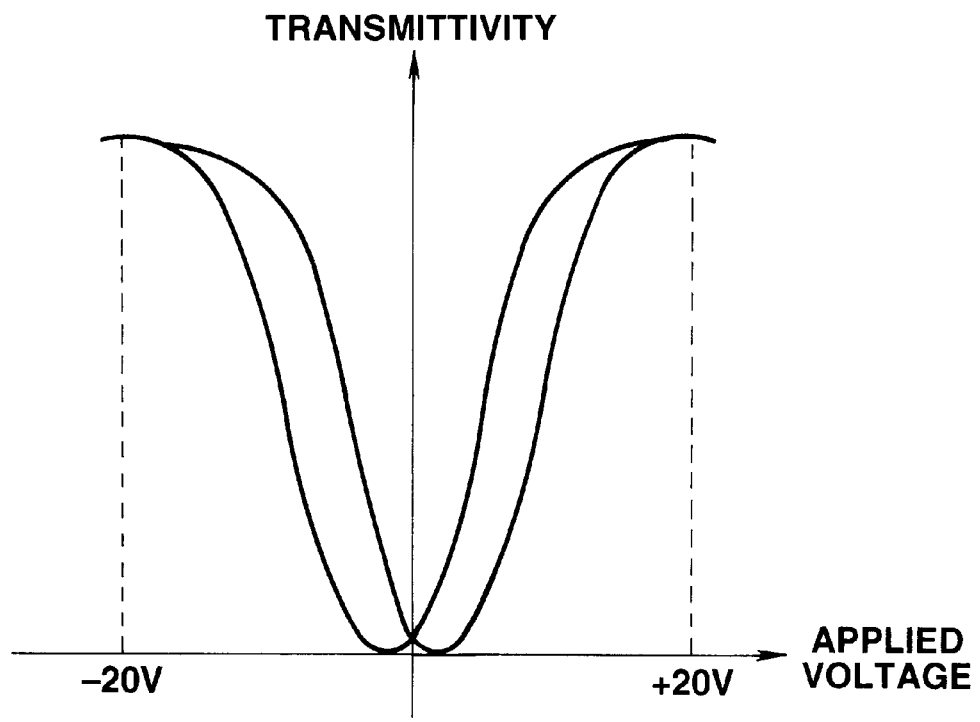
FIG. 9 is a graph showing the optical response characteristic for explaining an antiferroelectric liquid crystal usable in the third embodiment of this invention.

FIG. 9 exemplifies the optical response characteristic of this type of AFLC. This optical response characteristic is obtained by arranging a pair of polarization plates as shown in FIG. 3 and a voltage having a sufficiently low frequency of about 0.1 Hz and a triangular waveform is applied to the AFLC. The average direction of the liquid crystal molecules of the AFLC having this characteristic is not aligned to the direction normal to the smectic layer when the applied voltage is zero, but it is aligned to the direction normal to the smectic layer at two voltage values of the applied voltage other than zero. That is, there are two isolated voltage areas which set a dark state and no flat portion exist in the vicinity of the applied voltage range of 0 V. Because this type of AFLC has a wide applied-voltage range which causes antiferroelectric-ferroelectric phase transition pre-driving phenomenon, the AFLC has numerous intermediate optical states in accordance with the applied voltage and does not have any specific threshold value in its optical response characteristic. Therefore, this AFLC is suitable for the driving method of this invention.

The first and second AFLCs have a large cone angle of 30 degrees to 45 degrees (preferably 35 degrees or above) and large spontaneous polarization of about 200 or greater. Further, those AFLCs have a phase transition of I, SmA (Smectic A Phase) and SmCA* (Chiral Smectic CA* Phase).
(3) An AFLC having an optical response characteristic whose hysteresis is very narrow.

Figure 10:
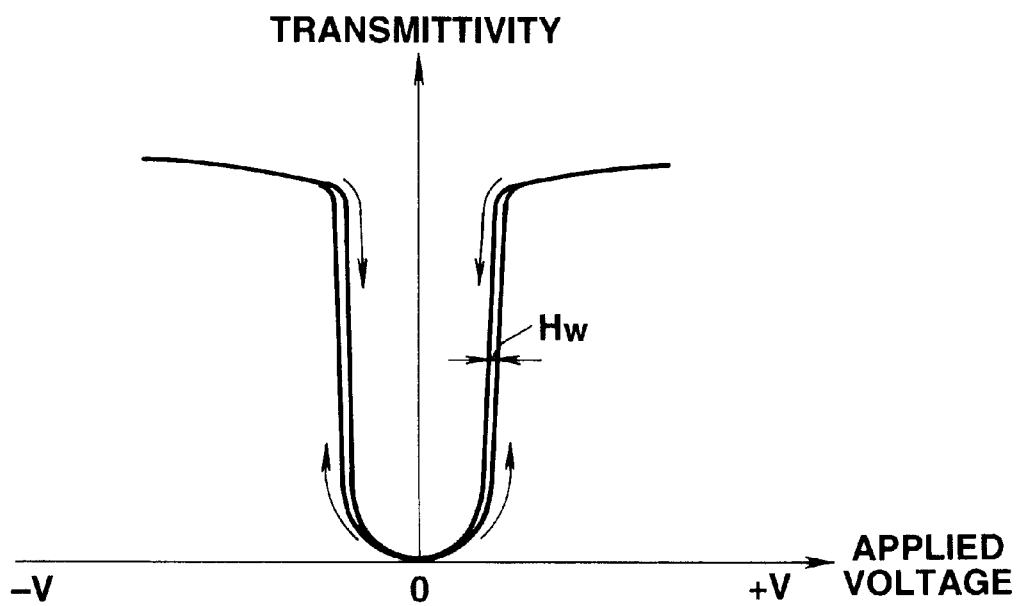
FIG. 10 is a graph showing the optical response characteristic for explaining an antiferroelectric liquid crystal usable in the third embodiment of this invention.

FIG. 10 exemplifies the optical response characteristic of this type of AFLC. This optical response characteristic is obtained by arranging a pair of polarization plates as shown in FIG. 3 and a voltage having a low frequency of about 0.1 Hz and a triangular waveform is applied to the AFLC. The optical response characteristic of this AFLC has a very narrow hysteresis of 0.5 V or below. This AFLC is also suitable for the driving method of this invention.

The other structure of the LCD device of the third embodiment is the same as those of the first and second embodiments.

According to the structure of the third embodiment, an image with an arbitrary gradation can also be displayed by driving the LCD device with the applied write voltage VD whose polarity is inverted frame by frame and whose absolute value corresponds to the display gradation.

SPECIFIC EXAMPLE 2

Figure 11:
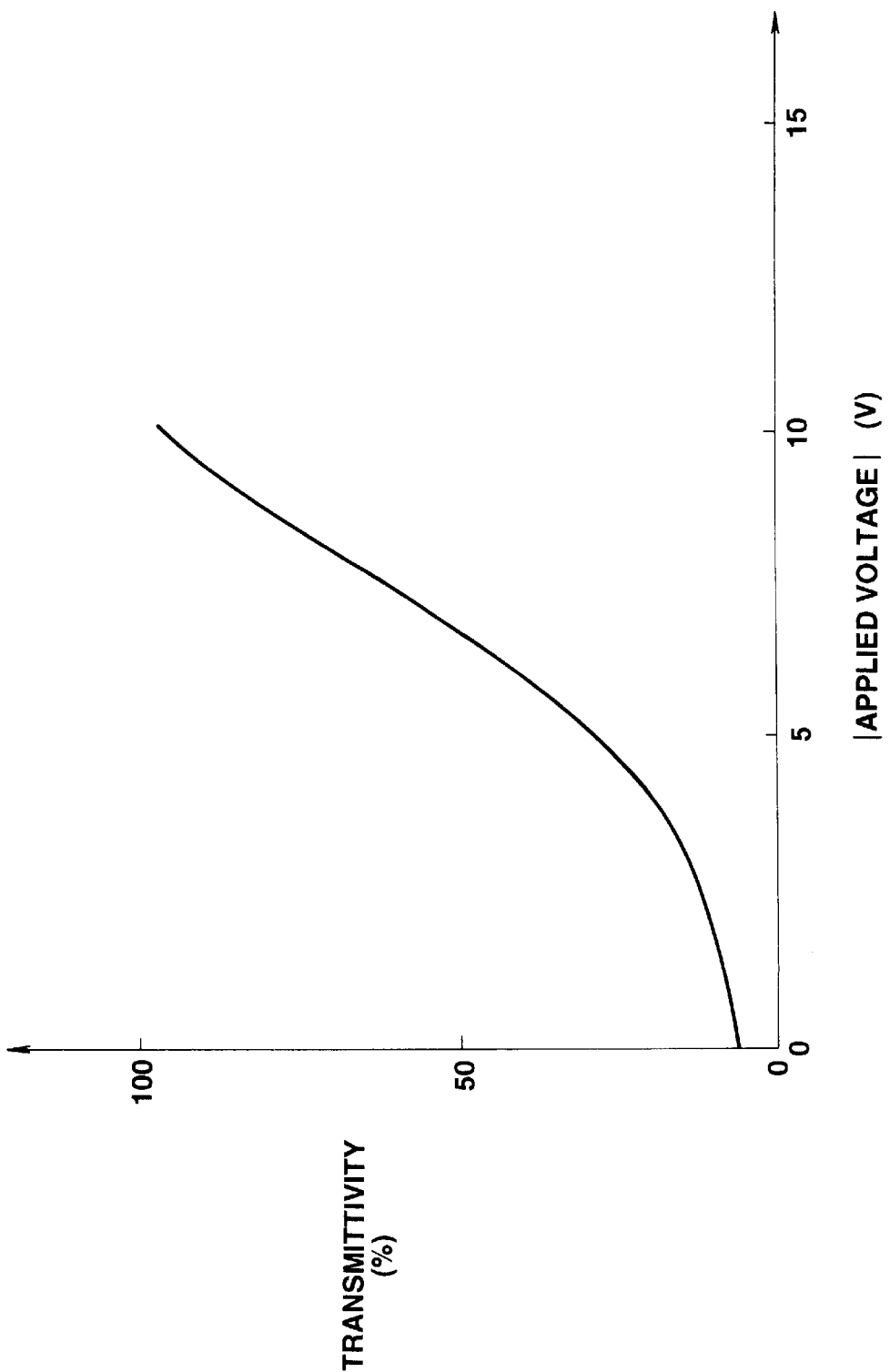
FIG. 11 is a graph showing the relation between the applied voltage and transmittivity for a specific example of an antiferroelectric liquid crystal display device according to the third embodiment of this invention.

FIG. 11 shows the relation between the applied voltage and transmittivity when the type (3) AFLC is used as the liquid crystal 11, the direction of the aligning treatment and the direction of the transmission axis of the polarization plate are set as illustrated in FIG. 3, each selection period TS is 60 $\mu$s, the polarity of the write voltage is inverted frame by frame as shown in FIG. 5B, and the absolute value of the write voltage is changed by the units of 0.5 V in the range of 0 V to 10 V.

It is apparent from this graph that this driving method allows the transmittivity to continuously change by altering the write voltage, and determines the display gradation almost specifically in accordance with the absolute value of the write voltage, thus ensuring gradation display.

Fourth Embodiment

A description will now be given of the driving circuit for an LCD device, which displays dynamic pictures like TV video images, by using the driving methods associated with the first to third embodiments.

Figure 12:
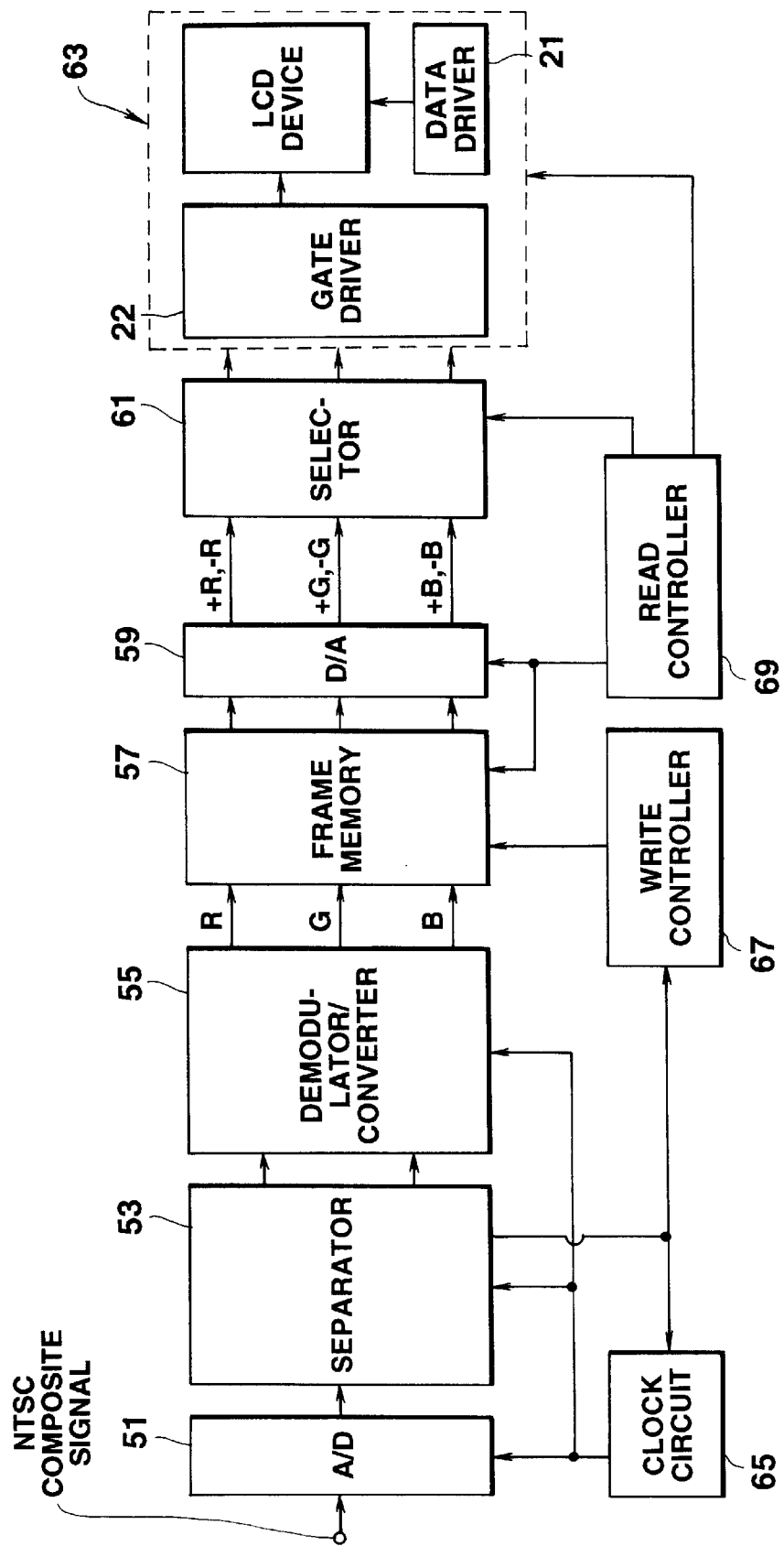
FIG. 12 is a block diagram of a driving circuit for an LCD device according to a fourth embodiment of this invention.

FIG. 12 shows the structure of an LCD apparatus according to this embodiment.

An ordinary NTSC composite signal externally supplied is converted by an A/D converter 51 to a digital signal, which is in turn supplied to a separator 53. The separator 53 separates a sync signal, a luminance signal and a hue signal from the received digital signal. The separated sync signal is supplied to a clock circuit 65 and a write controller 67. The luminance signal and hue signal are supplied to a demodulator/converter 55.

The demodulator/converter 55 produces RGB digital luminance signals from the received luminance signal and hue signal, and supplies the produced signals to the first port of a frame memory 57.

The frame memory 57 is constituted of a dual port memory having one screen (one frame) of a memory capacity.

A D/A converter 59 converts the RGB luminance signals, output from the second port of the frame memory 57, to corresponding analog luminance signals +R, +G and +B. At this time, inverted luminance signals −R, −G and −B are also output.

A selector 61 selectively outputs the RGB analog luminance signals +R, +G and +B and the inverted luminance signals −R, −G and −B to a LCD module 63.

The LCD module 63 has the structure as shown in FIGS. 1 to 3. In this embodiment, the LCD device displays a color image and has an R, G or B color filter arranged on each pixel electrode 3 in FIGS. 1 and 2.

The clock circuit 65 produces clock signals to control the operations of the A/D converter 51, separator 53 and demodulator/converter 55, and supplies the signals to those circuits.

The write controller 67 supplies a write control signal to the frame memory 57 in response to the sync signal from the separator 53.

A read controller 69 supplies a read control signal to the frame memory 57, and reads stored data in the frame memory 57 onto the second port. Further, the read controller 69 supplies a conversion timing signal to the D/A converter 59 to convert RGB digital luminous signals, read from the frame memory 57, to RGB analog luminous signals. The read controller 69 supplies a select control signal to the selector 61 and supplies timing control signals to the gate driver 21 and the data driver 22 of the LCD module 63.

In this embodiment, the frame frequency of an NTSC video signal is 60 Hz, the frame frequency of a display image of the LCD module 63 is 30 Hz, and the frame frequency of an image signal is also converted using the frame memory 57.

The operation of the thus constituted display apparatus will be described with reference to the timing charts in FIGS. 13A to 13D.

An NTSC composite signal is sequentially supplied to the A/D converter 51. In accordance with the conversion timing signal from the clock circuit 65, the A/D converter 51 converts the NTSC composite signal to a digital signal and supplies the latter signal to the separator 53. In accordance with the timing signal from the clock circuit 65, the separator 53 separates a sync signal, a luminance signal and a hue signal from the digital signal supplied from the A/D converter 51.

The demodulator/converter 55 produces a digital R luminance signal, a digital G luminance signal and a digital B luminance signal from the luminance signal and hue signal, and supplies the produced signals to the frame memory 57.

In accordance with the sync signal from the separator 53, the write controller 67 enables a write enable signal (active) in the first frame in two consecutive frames and disables the write enable signal (inactive) in the second frame.

In response to the write control signal from the write controller 67, therefore, the frame memory 57 sequentially stores the supplied RGB luminance signals every two frames.

In the case shown in FIGS. 13A to 13D, for example, the frame memory 57 sequentially stores the RGB luminance signals of the N-th frame, the (N+2)-th frame, the (N+4)th frame and so forth.

Figure 13:
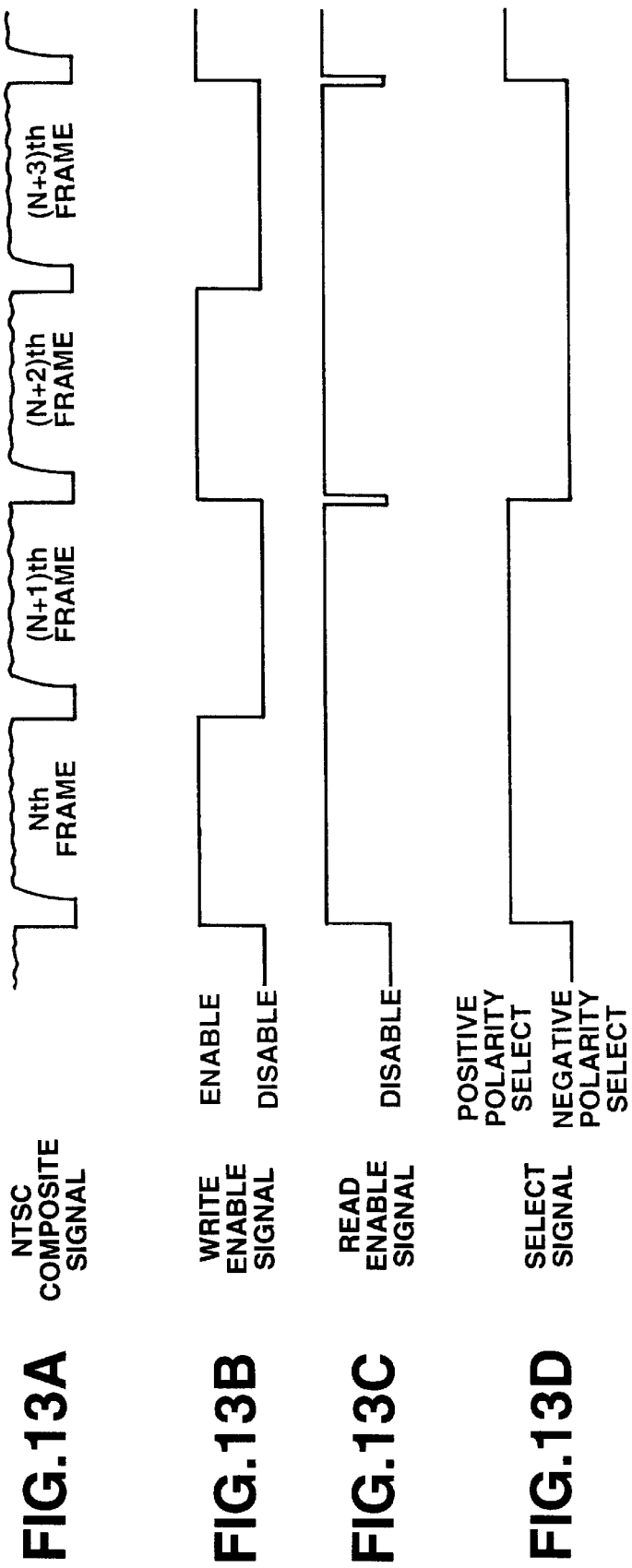
FIGS. 13A through 13D are timing charts for explaining the operation of the circuit shown in FIG. 12.

In accordance with the control signal from the read controller 69, which includes a read enable signal shown in FIG. 13C, the stored RGB luminance signals are sequentially read from the frame memory 57 and are then supplied to the D/A converter 59. In the example shown in FIGS. 13A–13D, the read frequency is a half the write frequency. Through the above processing, the frame frequency of the NTSC composite signal is converted to the frame frequency of the display image of the LCD module 63.

The D/A converter 59 converts the digital RGB luminance signals, output from the frame memory 57, to corresponding analog luminance signals +R, +G and +B and their inverted luminance signals −R, −G and −B, and outputs the resultant signals.

The selector 61 selectively outputs the RGB analog luminance signals +R, +G and +B and the inverted luminance signals −R, −G and −B to the LCD module 63 in accordance with a select signal shown in FIG. 13D.

In other words, the selector 61 alternately selects and outputs the RGB analog luminance signals of the positive polarity and the analog luminance signals of the negative polarity frame by frame.

The data driver 22 sequentially samples the RGB analog luminance signals or their inverted signals supplied from the selector 61, and applies the associated drive pulses to the individual data lines 6.

The gate driver 21 sequentially applies the gate pulse to the gate lines 5 to scan the lines 5. As a result, the TFTs 4 connected to the gate line 5 which is supplied with the gate pulse are turned on, applying the drive pulses to the associated pixel electrodes 3. When the selection period TS for that gate line is completed and the non-selection period TO starts, the gate pulse is disabled, turning off the associated TFTs 4. Consequently the voltage of the drive pulse is held in each pixel capacitor and each pixel is displayed with the gradation corresponding to the held voltage.

According to the described structure, one of two frames of an NTSC composite signal is stored in the frame memory 57, and in association with each data of the RGB luminance signals stored in the frame memory 57, one drive pulse is applied to the associated pixel. The polarity of the analog luminance signal is inverted for each frame of the display image of the LCD module. As described earlier in the foregoing description of the first to third embodiments, drive pulses of different polarities, which have absolute values corresponding to the display gradation, are sequentially applied to the individual pixels (pixel electrodes 3) frame by frame, thereby presenting a desired gradation image.

Although the foregoing description illustrates the structure for displaying a TV image of the NTSC system, another structure may also be employed and another type of image may be displayed as well.

While the two-frame period of an NTSC video signal is set equal to the one-frame period of the display image of the LCD module 63, those periods may be set arbitrarily.

In the structure in FIG. 12, the selector 61 is located at the subsequent stage of the D/A converter 59 to select one of the positive and negative analog luminance signals output from the D/A converter 59. The structure may however be modified in such a way that the read controller 69 controls the D/A converter 59 to output only the analog luminance signal of the polarity necessary at each occasion and supply it to the data driver 22.

In FIG. 3, the transmittivity 14A of one polarization plate 14 is set to the intermediate direction 11C between the first alignment direction 11A and the second alignment direction 11B, and the transmittivity 13A of the other polarization plate 13 is set perpendicular to the transmittivity 14A of the polarization plate 14. The transmittivity 13A of the other polarization plate 13 may however be set parallel to the transmittivity 14A of the polarization plate 14. In this case, the transmittivity of the LCD device becomes maximum when the applied voltage is 0 (or substantially 0), and this transmittivity decreases as t the absolute value of the applied voltage increases. If the absolute values of the applied voltages of the opposite polarities are equal to each other, however, the transmittivities become the same regardless of the polarities and the driving method of this invention can be applied.

The absorption axis of one polarization plate 14 may be set to the intermediate direction 14C between the first alignment direction 11A and the second alignment direction 11B, and the absorption axis of the other polarization plate 13 may be set perpendicular to the absorption axis of the polarization plate 14.

Although this invention has been described with reference to a transmission type LCD device in the foregoing description of the first to fourth embodiments, the LCD device may be of a reflection type. In this case, a reflector is provided back of the polarization plate 13 or 14. The reflection type LCD may be formed using only one polarization plate. In this case, for example, the polarization plate 14 is left intact and a reflector is provided in place of the polarization plate 13. The reflector may be formed of an aluminum layer deposited at the back of the substrate 1 by vacuum deposition, sputtering or the like, or may be formed of an aluminum foil adhered to the back of the substrate 1.

According to the first to fourth embodiments, as described above, gradation display can be presented by applying one drive pulse corresponding to the display image in each frame to each pixel. The driving method therefore becomes considerably simpler. So does the structure of the driving circuit.

As the polarity of the drive pulse is inverted frame by frame, it is possible to prevent the local concentration of charges applied to the liquid crystal and thus prevent the burning of the display or the like.

Further, since a single drive pulse is applied to each pixel in each selection period per frame, each selection period can be shortened, thus preventing flickering of the display, so that the obtained LCD apparatus has a high display quality.

Fifth Embodiment

While the desired gradation is obtained by changing the birifringence of the liquid crystal in the first to fourth embodiments, the desired gradation may be acquired by the so-called guest-host effect. The following will discuss an LCD device which uses a liquid crystal having a ferroelectric phase and acquires any gradation by the guest-host effect.

Figure 14:
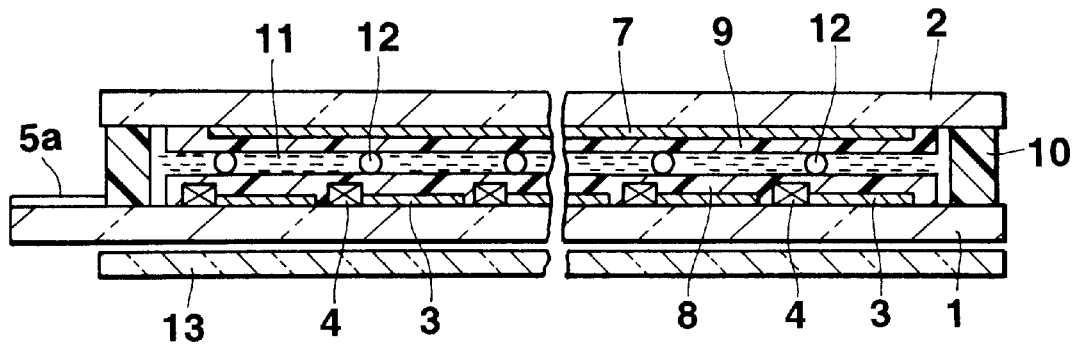
FIG. 14 is a cross-sectional view showing the structure of an LCD device according to a fifth embodiment of this invention.

As shown in FIG. 14, the LCD device of this embodiment has the same structure as the one shown in FIG. 1, except that the polarization plate 14 is omitted.

The liquid crystal 11 may be any of a DHF liquid crystal, an SBF liquid crystal and an AFLC.

Further, a dichroic dye is added to the liquid crystal 11. The dichroic dye consists of an azo-based or anthraquinone-based black dye or the like with the dichroic ratio of 5 to 12.

The amount of additive is properly selected in accordance with the thickness of the layer of the liquid crystal 11 and the dichroic ratio of the dichroic dye, and is set to, for example, 0.2 to 7percent by weight with respect to the liquid crystal 11. When the amount of additive is small, low gradation is difficult to display. When the amount of additive is too much, the display becomes darker, the dichroic dye becomes difficult to be dissolved in the liquid crystal 11 and the proper alignment of the liquid crystal 11 is interfered. In this respect, it is desirable that the amount of the additive be 0.7 to 4 percent by weight, particularly, 1 to 3 percent by weight. As the thickness of the layer of the liquid crystal 11 increases, the amount of the additive may be decreased.

The dichroic dye is aligned to t he alignment direction of the liquid crystal molecules and the average direction of the dichroic dye is aligned to the average direction of the liquid crystal molecules of the liquid crystal 11. In this embodiment, the absorption axis of the dichroic dye substantially matches with its long axis with its absorption anisotropy being positive.

The relationship between the directions of the alignment treatments on the alignment films 8 and 9, the direction of the optical axis of the polarization plate 13 and the alignment direction of the liquid crystal molecules of the liquid crystal 11 is the same as the one shown in FIG. 3.

The dichroic dye is aligned along the alignment direction of the liquid crystal molecules and the direction of its long axis changes between the first alignment direction 11A and the second alignment direction 11B.

The optical axis (transmission axis in this embodiment) of the polarization plate 13 is substantially set parallel to the direction of the alignment treatment 11C.

When the director (i.e., the average direction of long axes of the liquid crystal molecules) of the liquid crystal 11 are aligned to the intermediate direction (direction of the alignment treatment) 11C, the linearly polarized light having passed the polarization plate 13 passes the liquid crystal 11 as the linearly polarized light. The absorption axis (long axis) of the dichroic dye is parallel to the transmission axis 13A of the polarization plate 13. Therefore, the direction of the polarization of linearly polarized light having passed the polarization plate 13 matches with the absorption axis of the dichroic dye, so that the light having passed the polarization plate 13 is absorbed by the dichroic dye and the light transmittivity of the LCD device becomes minimum.

When the director of the liquid crystal 11 gradually changes from the intermediate direction 11C to the first alignment direction 11A or the second alignment direction 11B, the angle of intersection between the polarization direction of the linearly polarized light having passed the polarization plate 13 and the absorption axis of the dichroic dye gradually increases. Due to the birifringence effect of the liquid crystal 11, the linearly polarized light incident to the liquid crystal 11 becomes elliptically polarized light. As a result, the amount of light absorbed by the dichroic dye gradually decreases and the amount of the outgoing light from the liquid crystal increases, gradually making the display brighter. When the director of the liquid crystal 11 becomes the first alignment direction 11A or the second alignment direction 11B, the transmittivity and the display gradation become maximum.

The director of the liquid crystal 11 continuously varies between the first alignment direction 11A and the second alignment direction 11B in accordance with the polarity and the voltage value (absolute value) of the voltage applied between the pixel electrodes 3 and the opposing electrode 7. In accordance with the director of the liquid crystal 11, the amount of light absorption in the layer of the liquid crystal 11 changes.

When a low-frequency triangular voltage of about 0.1 Hz is applied between the pixel electrodes 3 and the opposing electrode 7 of the LCD device, the transmittivity continuously varies with respect to the applied voltage as shown in FIG. 4A, thus permitting a gradation image to be displayed.

Because this LCD device is of an active matrix type, the voltage for keeping the liquid crystal 11 in an arbitrary alignment state can be held even during a non-selection period. The LCD device with the above-described structure may be controlled by the driving method shown in FIGS. 5A and 5B to present a good gradation display by changing the transmittivity.

Since the LCD device with the above structure uses a single polarization plate, the amount of light absorbed by the polarization plate is smaller, and the display becomes brighter, as compared with the case where two polarization plates are used. Further, the coloring of the display image can be prevented.

As the transmittivity does not depend on the optical anisotropy An of the liquid crystal 11 and the produce And of the optical anisotropy An and the layer thickness d of the liquid crystal 11, it is possible to improve the freedom of selection of the layer thickness of the liquid crystal 11.

Although the transmittivity 13A of the polarization plate is aligned to the direction of the alignment treatment 11C in the above-described embodiment, the absorption axis may be aligned to the direction of the alignment treatment 11C. In this case, the transmittivity becomes maximum in the intermediate alignment state and becomes minimum when the first and second alignment states. While the polarization plate 13 is arranged on the light-incident side, it may be arranged on the outgoing-side (view field side).

Sixth Embodiment

Although a transparent LCD device which uses a liquid crystal having a ferroelectric phase in a guest-host mode has been described in the foregoing description of the fifth embodiment, a reflection type of LCD device may be designed too.

Figure 15:
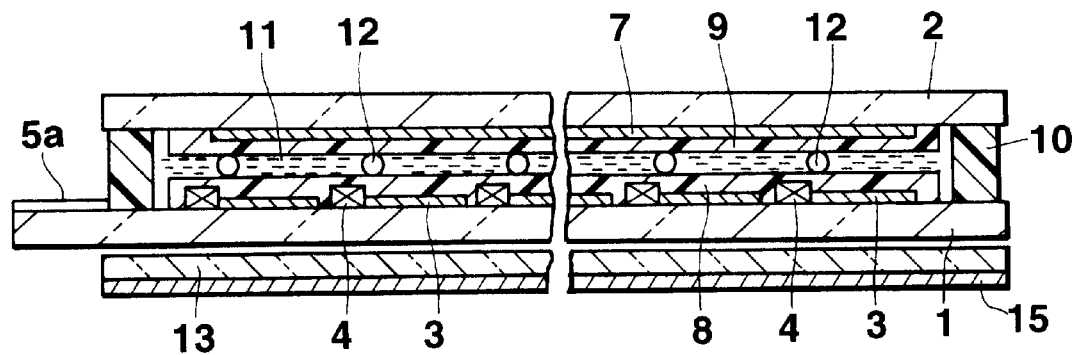
FIG. 15 is a cross-sectional view showing a structural example in the case where the LCD devices according to the first to fifth embodiments of this invention are of a reflection type.

FIG. 15 shows the structure of an LCD device which uses a liquid crystal having a ferroelectric phase and is a transparent type guest-host mode. This LCD device has the polarization plate 14 (or 13) removed from the structure in FIG. 1 and has a reflector 15 located at the back of the polarization plate 13 (or 14).

The light which was incident from the above and passed the substrate 2 and the liquid crystal 11 includes various polarized light components. Of those polarized light components, the polarized light component parallel to the abortion axis of the dichroic dye is absorbed by the dichroic dye and reaches the polarization plate 13. The light which has reached the polarization plate 13 passes the polarization plate 13 to become linearly polarized light. This linearly polarized light is reflected by the reflector 15 and passes through the polarization plate 13 again as the linearly polarized light to be incident on the liquid crystal 11. Of the incident light, the polarized light component parallel to the absorption axis of the dichroic dye is absorbed by the dichroic dye and goes out from the layer of the liquid crystal 11.

When the director of the liquid crystal 11 is matched with the direction of the alignment treatment 11C, only the component of the incident light from the upper substrate 2 which is the component in the direction of the absorption axis of the dichroic dye and which has not been absorbed by the dichroic dye passes the polarization plate 13 to become linearly polarized light. This linearly polarized light is incident to the reflector 15. The linearly polarized light which is reflected by the reflector 15 and passes through the polarization plate 13 passes the layer of the liquid crystal 11 directly as the linearly polarized light, and is then absorbed by the dichroic dye. Consequently, the transmittivity of the light from the LCD device becomes minimum.

When the director of the liquid crystal 11 gradually changes from the intermediate direction 11C to the first alignment direction 11A or the second alignment direction 11B, the angle between the direction of the polarized light component of the incident light, absorbed by the dichroic dye, and transmittance axis 13A of the polarization plate 13 and the angle of intersection between the linearly polarized light, which has been reflected by the reflector 15 and has passed the polarization plate 13, and the absorption axis of the dichroic dye slowly increase. Due to the birifringence effect of the liquid crystal 11, the linearly polarized light incident to the liquid crystal 11 becomes elliptically polarized light. As a result, the intensity of the light component of the incident light from the upper substrate 2, which passes the polarization plate 13, increases, and the amount of light, reflected by the reflector 15, passed the polarization plate 13 and absorbed by the dichroic dye, the gradually decreases. Therefore, the amount of the outgoing light from the liquid crystal increases, gradually making the display brighter. When the average alignment direction of the liquid crystal molecules of the liquid crystal 11 becomes the first alignment direction 11A or the second alignment direction 11B, the transmittivity and the display gradation become maximum.

The director of the liquid crystal 11 continuously varies between the first alignment direction 11A and the second alignment direction 11B in accordance with the polarity and the voltage value (absolute value) of the voltage applied between the pixel electrodes 3 and the opposing electrode 7. In accordance with the average alignment direction, the amount of light absorption in the layer of the liquid crystal 11 changes.

When a low-frequency triangular voltage of about 0.1 Hz is applied between the pixel electrodes 3 and the opposing electrode 7 of the LCD device, the transmittivity continuously varies with respect to the applied voltage as shown in FIG. 4A, thus permitting a gradation image to be displayed in this embodiment too.

Because this LCD device is of an active matrix type, the voltage for keeping the liquid crystal 11 in an arbitrary alignment state can be held even during a non-selection period. The transmittivity may therefore be changed to ensure gradation display by the driving method shown in FIGS. 5A and 5B.

Since the LCD device with the above structure uses a single polarization plate, the amount of light absorbed by the polarization plate is smaller, and the display becomes brighter, than that absorbed when two polarization plates are used. Further, the coloring of the display image can be prevented.

As the transmittivity does not depend on the optical anisotropy Δn of the liquid crystal 11 and the produce And of the optical anisotropy Δn and the layer thickness d of the liquid crystal 11, unlike in the conventional ferroelectric liquid crystal, it is possible to improve the freedom of selection of the layer thickness of the liquid crystal 11.

Although the transmittivity 13A of the polarization plate is aligned to the direction of the alignment treatment 11C in the above-described embodiment, the absorption axis may be aligned to the direction of the alignment treatment 11C. In this case, the transmittivity becomes maximum in the intermediate alignment state and becomes minimum when the first and second alignment states. While the polarization plate 13 is arranged on the light-incident side, it may be arranged on the outgoing-side (view field side).

Although the dichroic dye in use in the fifth and sixth embodiments has a positive absorption anisotropy, a dichroic dye, which has a negative absorption anisotropy and whose absorption axis is perpendicular to the direction of the long axis, may also be used.

The targets for the driving method of this embodiment are not limited to TFTs as active elements, and the driving method may be used to drive an LCD device having MIM (Metal Insulator Metal) elements as active elements.

What is claimed is:

1. A liquid crystal display apparatus comprising:

a liquid crystal display device using a liquid crystal having a ferroelectric phase and including a first substrate having pixel electrodes formed thereon, a second substrate having an opposing electrode facing said pixel electrodes, formed thereon, a liquid crystal having a ferroelectric phase and arranged between said first and second substrates, and at least one polarization plate arranged at a back of at least one of said first and second substrates, said liquid crystal display device having optical response characteristics which are caused by antiferroelectric-ferroelectric phase transition pre-driving phenomenon and which show that optical changes corresponding to continuous changes in voltages of one polarity to be applied between said pixel electrodes and said opposing electrode and optical changes corresponding to continuous changes in voltages of another polarity whose absolute values are equal to that of the voltages of said one polarity are substantially equal; and driving means for receiving one image signal corresponding to a display image and applying one drive pulse corresponding to said one image signal which has a voltage representing a display gradation of said display image, between associated ones of said pixel electrodes and said opposing electrode and inverting a polarity of said application voltage frame by frame.

2. The liquid crystal display apparatus according to claim 1, wherein said liquid crystal has a layer structure in a smectic phase, and is alienable to a first alignment state in which liquid crystal molecules are substantially aligned to a first alignment direction, to a second alignment state in which said liquid crystal molecules are substantially aligned to a second alignment direction and to an intermediate alignment state in which an average alignment direction of said liquid crystal molecules is aligned toward an arbitrary direction between said first and second alignment directions in accordance with a voltage applied between said pixel electrodes and said opposing electrode; and said at least one polarization plate includes first and second polarization plates, said first polarization plate having an optical axis set substantially parallel to a normal direction of said layer structure in said smectic phase, said second polarization plate having an optical axis set perpendicular or parallel to said optical axis of said first polarization plate.

3. The liquid crystal display apparatus according to claim 1, wherein an absolute value of a drive pulse of a positive polarity and an absolute value of a drive pulse of a negative polarity for display of a same gradation are substantially equal to each other.

4. The liquid crystal display according to claim 1, wherein an absolute value of a drive pulse of a positive polarity and an absolute value of a drive pulse of a negative polarity for display of a same gradation differ from each other.

5. The liquid crystal display apparatus according to claim 1, wherein said liquid crystal display device is an active matrix type having active elements connected to said pixel electrodes, and said drive means applies said drive pulse via an associated one of said active elements to said liquid crystal in a selection period for each pixel and disables said associated active element (4) in a non-selection period for said each pixel.

6. The liquid crystal display apparatus according to claim 1, wherein said liquid crystal is a liquid crystal showing an antiferroelectric phase when no voltage is applied.

7. The liquid crystal display apparatus according to claim 1, wherein said liquid crystal is a liquid crystal whose optical response characteristic has no specific threshold value and continuously and smoothly changes, and which shows a substantially same optical change in association with a change in an absolute value of voltages of different polarities to be applied to said liquid crystal.

8. The liquid crystal display apparatus according to claim 1, wherein said liquid crystal comprises at least one of (1) a liquid crystal showing an antiferroelectric phase only within a very narrow range equal to or smaller than a predetermined range in which an applied voltage is in a vicinity of 0 V, showing a sharp change in an optical response characteristic curve, and hardly having flat areas in an area having an antiferroelectric phase, (2) an antiferroelectric liquid crystal having an applied-voltage range equal to or greater than a predetermined range, which causes antiferroelectric-ferroelectric phase transition pre-driving phenomenon, having a plurality of intermediate optical states in accordance with said applied voltage and having no specific threshold value in an optical response characteristic, (3) an antiferroelectric liquid crystal whose director is not aligned to a direction normal to a layer of a layer structure in a smectic phase when said applied voltage is 0 V, but is aligned to said direction normal to said layer of the layer structure at two voltage values of said applied voltage other than zero, (4) an antiferroelectric liquid crystal having two isolated voltage areas which set a dark state or a bright state and having no flat portion present in a vicinity of an applied voltage range of 0 V, and (5) an antiferroelectric liquid crystal whose optical response characteristic has a very narrow hysteresis.

9. The liquid crystal display apparatus according to claim 1, wherein said drive means includes means for applying a drive pulse having voltages whose absolute values differ from each other to said pixel electrodes and said opposing electrode in accordance with a polarity, with respect to an image signal indicating a same display gradation in accordance with a difference in an optical change of said liquid crystal caused by a polarity of an applied voltage.

10. The liquid crystal display apparatus according to claim 1, wherein said liquid crystal contains a dichroic dye.

11. A liquid crystal display apparatus comprising:
a liquid crystal display device including a first substrate having pixel electrodes formed thereon, a second substrate having an opposing electrode facing said pixel electrodes, formed thereon, a liquid crystal having a ferroelectric phase and a layer structure in a smectic phase, said liquid crystal being alignable to a first alignment state in which liquid crystal molecules are substantially aligned to a first alignment direction, to a second alignment state in which said liquid crystal molecules are substantially aligned to a second alignment direction and to an intermediate alignment state in which an average alignment direction of said liquid crystal molecules is aligned toward an arbitrary direction between said first and second alignment directions in accordance with a voltage applied between said pixel electrodes and said opposing electrode, a first polarization plate having an optical axis set substantially parallel to a normal direction of a layer of said layer structure of said liquid crystal, and a second polarization plate having an optical axis set perpendicular or parallel to said optical axis of said first polarization plate, said liquid crystal display device having optical response characteristics which are caused by antiferroelectric-ferroelectric phase transition pre-driving phenomenon, and which show that optical changes corresponding to continuous changes in voltages of one polarity to be applied between said pixel electrodes and said opposing electrode and optical changes corresponding to continuous changes in voltages of another polarity whose absolute values are equal to those of the voltages of said one polarity are substantially equal; and drive means for receiving one image signal corresponding to a display image and applying one drive pulse corresponding to said one image signal which has a voltage representing a display gradation of said display image between associated ones of said pixel electrodes and said opposing electrode while inverting a polarity of said application voltage frame by frame.

12. A method of driving a liquid crystal display device including a first substrate having pixel electrodes formed thereon, a second substrate having an opposing electrode facing said pixel electrodes, formed thereon, a liquid crystal having a ferroelectric phase and arranged between said first and second substrates, and at least one polarization plate, said liquid crystal display device having optical response characteristics which are caused by antiferroelectric-ferroelectric phase transition pre-driving phenomenon and which show that optical changes corresponding to continuous changes in voltages of one polarity to be applied between said pixel electrode and said opposing electrode and optical changes corresponding to continuous changes in voltages of another polarity whose absolute values are equal to those of the voltages having said one polarity are substantially equal, said method comprising receiving one image signal corresponding to a display image frame by frame and applying one drive pulse corresponding to said one image signal which has a voltage whose absolute value represents a display gradation of said display image, between associated ones of said pixel electrodes and said opposing electrode while inverting a polarity of said application voltage frame by frame.

13. The method according to claim 12, wherein said liquid crystal display device is of an active matrix type having active elements connected to said pixel electrodes, and said method includes the steps of:
applying said drive pulse via an associated one of said active elements to said liquid crystal in a selection period for each pixel; and
disabling said active elements in a non-selection period for said each pixel.

14. The method according to claim 12, wherein said liquid crystal is a liquid crystal showing an antiferroelectric phase when no voltage is applied.

15. The method according to claim 12, wherein said liquid crystal is a liquid crystal whose optical response characteristic has no specific threshold value and continuously and smoothly changes, and which shows a substantially same optical change in association with a change in an absolute value of voltages of different polarities to be applied to said liquid crystal.

16. The method according to claim 12, wherein said liquid crystal comprises at least one of (1) a liquid crystal showing an antiferroelectric phase only within a very narrow range in which an applied voltage is in a vicinity of 0 V, showing a sharp change in an optical response characteristic curve, and hardly having flat areas in an area having an antiferroelectric phase, (2) an antiferroelectric liquid crystal having an applied-voltage range equal to or greater than a predetermined range, which causes antiferroelectric-ferroelectric phase transition pre-driving phenomenon, having a plurality of intermediate optical states in accordance with said applied voltage and having no specific threshold value in an optical response characteristic, (3) an antiferroelectric liquid crystal whose director is not aligned to a direction normal to a layer of a layer structure in a smectic phase when said applied voltage is 0 V, but is aligned to said direction normal to a layer of said layer structure at two voltage values of said applied voltage other than zero, (4) an antiferroelectric liquid crystal having two isolated voltage areas which set a dark state or a bright state and having no flat portion present in a vicinity of an applied voltage range of 0 V, and (5) an antiferroelectric liquid crystal whose optical response characteristic has a very narrow hysteresis.

17. The method according to claim 12, wherein said driving step includes means for applying a drive pulse having voltages whose absolute values differ from each other to said pixel electrodes and said opposing electrode in accordance with an polarity, with respect to an image signal indicating a same display gradation in accordance with a difference in an optical change of said liquid crystal caused by a polarity of an applied voltage.

18. The method according to claim 12, wherein said liquid crystal contains a dichroic dye.

19. The liquid crystal display device according to claim 15, further comprising a reflector arranged outside said polarization plate.

* * * * *